US012739472B2

(12) United States Patent
Hays et al.

(10) Patent No.: US 12,739,472 B2
(45) Date of Patent: Sep. 15, 2026

(54) ZERO TOUCH PLAY

(71) Applicant: Atmosphere.tv, Austin, TX (US)

(72) Inventors: Brent A. Hays, Austin, TX (US); Jeffrey C. DiTullio, Austin, TX (US); Zachary D. Hobbs, Austin, TX (US)

(73) Assignee: Atmosphere.tv, Austin, TX (US)

( * ) Notice: Subject to any disclaimer, the term of this patent is extended or adjusted under 35 U.S.C. 154(b) by 0 days.

(21) Appl. No.: 18/823,921

(22) Filed: Sep. 4, 2024

(65) Prior Publication Data

US 2026/0067537 A1 Mar. 5, 2026

(51) Int. Cl.
*H04N 21/458* (2011.01)
*H04N 21/414* (2011.01)
*H04N 21/443* (2011.01)
*H04N 21/462* (2011.01)

(52) U.S. Cl.
CPC ..... *H04N 21/458* (2013.01); *H04N 21/41415* (2013.01); *H04N 21/4432* (2013.01); *H04N 21/4622* (2013.01)

(58) Field of Classification Search
CPC ........... H04N 21/458; H04N 21/41415; H04N 21/4432; H04N 21/4622
See application file for complete search history.

(56) References Cited

U.S. PATENT DOCUMENTS 6,961,859 B2 * 11/2005 Derocher .............. G06F 1/3203 713/323
8,026,805 B1 * 9/2011 Rowe ...................... G06F 16/48 340/573.1
9,293,042 B1 * 3/2016 Wasserman .............. G08G 1/09
9,584,863 B1 * 2/2017 Teoh .................. H04N 21/4627
10,469,916 B1 * 11/2019 Teller ................. G02B 27/0172
2007/0006077 A1 * 1/2007 Grubbs .............. H04N 21/8146 725/38
2007/0094025 A1 * 4/2007 Cho ..................... H04N 21/478 704/254
2007/0283179 A1 * 12/2007 Burnett .................... H04N 5/63 713/324
2008/0244097 A1 * 10/2008 Candelore .......... H04N 21/4432 710/5
2010/0066484 A1 * 3/2010 Hanwright ........ H04L 12/40013 455/66.1
2012/0114336 A1 * 5/2012 Kim ................. H04N 21/41415 398/106

(Continued)

FOREIGN PATENT DOCUMENTS

CN 108347649 A * 7/2018 ........... H04N 21/458
WO WO-2021182906 A1 * 9/2021 ........... H04N 21/485

*Primary Examiner* — Fernando Alcon

(57) ABSTRACT

Systems and methods are disclosed for implementing a system to automatically control a display device according to a schedule, without the need for direct manual control. In certain embodiments, a method may comprise implementing a zero touch play (ZTP) system for automated display device control, including determining a schedule to implement for a display device, and monitoring the schedule for a wake time trigger event indicating when to wake up the display device. In response to detecting the wake time trigger event, the method may comprise sending a first control command directing the display device to enter an active state, and setting the display device to a selected input source to play on the display device.

20 Claims, 5 Drawing Sheets

(56) References Cited

U.S. PATENT DOCUMENTS

| | | | | |
|---|---|---|---|---|
| 2014/0043296 | A1* | 2/2014 | Barnes | H04N 21/8186 345/175 |
| 2015/0215566 | A1* | 7/2015 | McRae | H04N 5/63 348/730 |
| 2016/0044073 | A1* | 2/2016 | Rosenberg | H04L 67/535 715/753 |
| 2016/0112758 | A1* | 4/2016 | Langille | H04N 21/4508 725/152 |
| 2016/0127675 | A1* | 5/2016 | Ahn | H04N 21/4432 348/734 |
| 2016/0173943 | A1* | 6/2016 | Roberts | H04N 21/6125 725/110 |
| 2017/0230710 | A1* | 8/2017 | Cha | H04N 21/43078 |
| 2018/0018704 | A1* | 1/2018 | Tunnell | G06Q 30/0269 |
| 2019/0056775 | A1* | 2/2019 | Chung | G06F 1/3265 |
| 2021/0099745 | A1* | 4/2021 | Lee | H04N 21/2187 |
| 2022/0095006 | A1* | 3/2022 | Seed | H04N 21/4788 |
| 2024/0272784 | A1* | 8/2024 | Allex | G06F 3/04847 |
| 2024/0378004 | A1* | 11/2024 | Krishnan | G06F 3/14 |

* cited by examiner

Configuration Service 102

DB 120

ZTP Module 122

User Device 106

Network 108

Display 112

Zero Touch Play Device 104

Content Source 110

Cable Box 114

Antenna 116

Streaming 118

ZERO TOUCH PLAY

SUMMARY

In certain embodiments, a method may comprise implementing a zero touch play (ZTP) system for automated display device control, including determining a schedule to implement for a display device, and monitoring the schedule for a wake time trigger event indicating when to wake up the display device. In response to detecting the wake time trigger event, the method may comprise sending a first control command directing the display device to enter an active state, and setting the display device to a selected input source to play on the display device.

In certain embodiments, a system may comprise a zero touch play (ZTP) system configured to implement automated control of a display device, including determine a schedule to implement for a display device, and monitor the schedule for a wake time trigger event indicating when to wake up the display device. In response to detecting the wake time trigger event, the system may send a first control command directing the display device to enter an active state, and set the display device to a selected input source to play on the display device.

In certain embodiments, a memory device may store instructions that, when executed, cause a processor to perform a method comprising implementing a zero touch play (ZTP) system for automated display device control via a ZTP device connected to a display device, including determining a schedule to implement for the display device, and monitoring the schedule for a wake time trigger event indicating when to wake up the display device. In response to detecting the wake time trigger event, the method may comprise sending a first control command directing the display device to enter an active state, and setting the display device to a selected input source to play on the display device.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a physical device, such as a computer readable storage medium or memory device, including instructions that, when executed, cause a processor to perform the methods.

Figure 1:
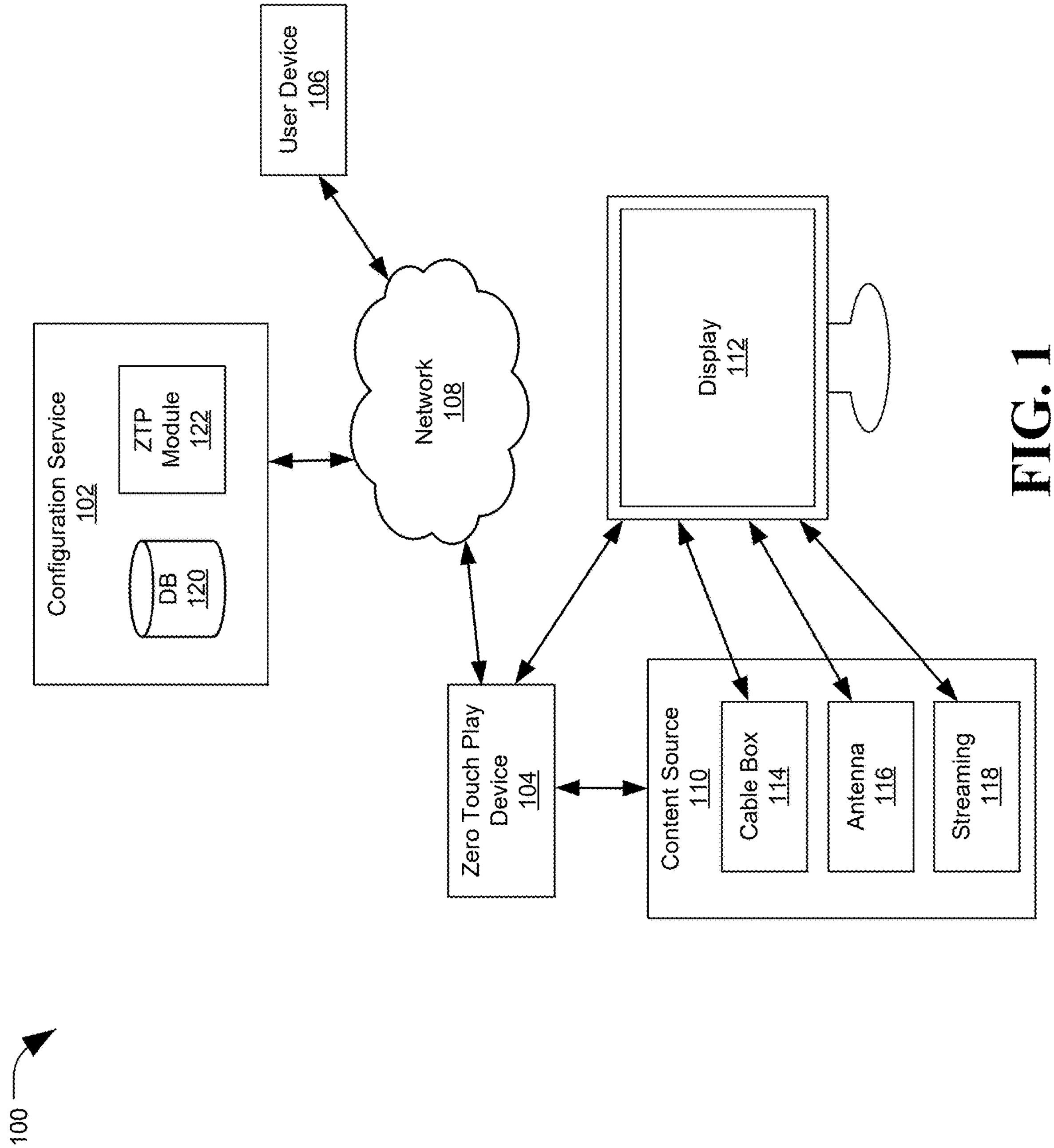
FIG. 1 is a diagram of a system configured to implement zero touch play, in accordance with certain embodiments of the present disclosure.

FIG. 1 depicts a diagram of a system 100 configured to implement zero touch play, in accordance with certain embodiments of the present disclosure. The system 100 may include a configuration (or config) service 102, a zero touch play (ZTP) device 104, a user device 106, one or more content sources 110, a display device 112, and a network 108 over which the components of system 100 may communicate and exchange data. Each or any of config service 102, ZTP device 104, user device 106, content source 110, display 112, and network 108 may be implemented via computers, servers, hardware and software modules, or other system components.

Businesses may set up display devices 112 such as televisions or monitors at public venues, such as restaurants, bars, lounges, or similar locations. Business owners may wish to have content displayed on these display devices 112 during business hours, or certain timeframes within business hours, and otherwise may wish to turn off the displays 112. Further, display devices 112 may have access to multiple different content sources 110, each of which may potentially be connected to a different input of the display device 112. Business owners may wish to have one input as a default each day, or a different input on different days, even if the input gets changed at some point during business hours. In order to operate the display device 112, and potentially various content source devices 110, business employees may need to locate and utilize remote controls or other input apparatus to turn on or off the display 112, and potentially require other remotes to control or switch to the desired input devices. Busy employees may forget to turn on or off the displays 112, may not know what input to change the displays to, or may ignore controlling the displays 112 rather than hunt for a control device. To address these issues, system 100 provides an implementation for zero touch play control for the display device 112.

Zero touch play (ZTP) may be an automated display device 112 control system, enabling users to automate displays 112 to wake up and start playing the content the user wishes without the need for remote controls. In particular, users may be able to set up a schedule to turn display devices 112 on or off according to a business' hours of operation, a configured schedule, or a combination thereof. In some examples, ZTP may be implemented for HDMI (high-definition multimedia interface)-CEC (consumer electronics control) enabled display devices, allowing an attached ZTP device 104 to send control commands to the display 112 over an HDMI connection. The system 100 may include a configuration service 102 allowing users to configure the control settings for the display 112, and a ZTP device 104 configured to automatically implement the settings and schedules to wake up the display 112, set it to a desired input or content source 110, or turn off the display 112, all without any direct human intervention or remote control usage.

Content sources 110 may include devices that may plug into display 112 or ZTP device 104 (e.g., via HDMI cables, coaxial cables, or other physical or wired connections), or connect via local Wi-Fi, Bluetooth, or other limited-range wireless transmission options. Content source 110 may include a cable box 114, satellite television box, or other broadcast feed device. Another example content source may include an antenna (e.g., digital or analog) for receiving local broadcast transmissions. Content sources 110 may also include a streaming box 118, such as a set-top box or dongle that provides internet streaming content. Content sources 110 may provide content for display on display screen 112, for example via plugging into ZTP device 104, which is itself connected to display 112.

Configuration service 102 may be implemented as a cloud service having an application programing interface (API) that allows users (e.g., via user device 106) to set up their ZTP configurations and schedules. In some embodiments, configuration service 102 may be part of a streaming service that provides content to consumers, such as various channels and genres or types of video, sports, television programming, movies, etc. Config service 102 may include a ZTP module 122, and a database or other data storage element 120.

ZTP module 122 may generate or publish a web portal interface, app, or other API access point to config service 102. The web interface may be accessed by user device 106 via network 108. The web interface may allow a user to configure the ZTP settings to be implemented on their display device 112, for example via ZTP device 104. For example, a user may use their user device 106 and the web interface to register a ZTP device 104 connected to their display 112 with the config service 102. In other examples, the config service 102 may be configured to work with other set top boxes (e.g., within content sources 110) or smart displays 112 directly, so that a user can connect their other devices to the configuration service 102. The user may, for each ZTP device 104 or display 112, set a schedule for when display 112 should be automatically turned on or off, and what input device 110 the display 112 should be set to. In some examples, a user may set the hours of operation for a business at which the display 112 is situated, and may set the ZTP schedule for the display 112 based on the business hours. In another example, the ZTP schedule may be set for a display 112 based on a custom schedule not connected to the business hours. In some examples, users may set the input to change to different content source devices 110 during a day according to a set schedule. For example, a TV display 112 may be set to turn on at 11 AM on Sundays set to a cable box 114 input, and then at 4 PM switch to a streaming device 118 input, and finally to turn off at 9 PM. Different schedules may be set for different displays 112 within a same venue, or a same schedule may be applied across multiple venues, or any other configuration.

The schedule and configuration settings selected by the user may be stored to DB 120. DB 120 may store the ZTP information, an associated user account, a ZTP device 104 or display 112 device ID, other relevant metadata, or any combination thereof. DB 120 may comprise one or more data storage devices, data storage mediums, data storage servers, and related data structures, collectively referred to as database (DB) 120.

In addition to managing ZTP configuration settings, config service 102 may also support, control, or maintain ZTP device 104 over network 108. For example, config service 102 may publish, update, or maintain software or firmware modules to enable the operation of ZTP device 104, and enable continued interoperability between ZTP device 104 and other devices to which ZTP device 104 may connect and interact. In some examples, config service 102 may generate, publish, or broadcast streaming content to ZTP device 104. Some or all of the content, such as video segments or advertisements, may be obtained or transmitted from other content providers (not shown). Config service 102 may be configured with the capability to adjust or change behavior at the ZTP device 104 (e.g., through commands sent via network 108) to change the channel or content feed displaying via the ZTP device 104, adjust the volume or display settings, change the display 112 to a different content source 110, or otherwise control the operation of ZTP device 104 or display 112.

ZTP device 104 may include or be connected to a display 112, which may be a television, monitor, digital billboard, computer, smartphone, or other device having a digital display element. ZTP device 104 which may include one or more computers, smartphones, set-top boxes, or televisions, may be in communication with config service 102, such as to obtain the ZTP configuration settings for display 112, to receive streamed entertainment content from configuration service 102, such as video on demand (VOD), live broadcasts, or other video content feeds, or for other communications.

The ZTP device 104 may include a system-level application that runs on boot up of the ZTP device. The application may, on boot and at periodic or selected intervals, receive or retrieve ZTP configuration settings from the config service 102 database 120. For example, the ZTP device 104 may provide its unique device identifier to config service 102 over network 108, which in response may lookup the corresponding ZTP configuration settings from DB 120, and return them to ZTP device 104. In another example, the ZTP device 104 may connect to config service 102, and the config service 102 may send commands to the ZTP device 104 to implement actions from the ZTP schedule as they arise.

The ZTP device 104 (or config service 102) may maintain an internal clock (e.g., set via connection to network 108) which may be used to monitor the ZTP schedule for display 112. Even if the ZTP device 104 enters a sleep or standby mode, it may continue to monitor the ZTP schedule as a background service, and wake itself up to implement any actions for the ZTP schedule. Alternately, the ZTP device 104 may receive control commands from config service 102 even when the ZTP device 104 is in sleep or standby mode.

A business may connect ZTP device 104 to a television or video display device 112 at the business location (e.g., at a bar or restaurant) for the entertainment of customers. Display 112 may also be connected to one or more other content source 110 devices, either directly, or by way of ZTP device 104. For example, ZTP device 104 may have source inputs to which content sources 110 can connect, and the various content sources 110 can be provided to display 112 via ZTP device 104, for example via a dashboard, home screen, or other menu or navigation user interface (UI) generated by ZTP device 104 on display 112.

The ZTP device 104 may send commands to display 112 to implement functions according to the ZTP schedule. In some embodiments, ZTP device 104 may follow the ZTP schedule itself and determine when to generate commands to send to display 112. In another example, config service 102 may send control signals (e.g., via network 108) to ZTP device 104 based on the schedule, directing the ZTP device to turn on or off display 112, or to change the channel, input, or both in order to set display 112 to the selected input or content source 110. ZTP device 104 may generate control commands to control the display 112, a corresponding content source 110 device, or both. For example, ZTP device 104 may generate consumer electronic control (CEC) signals or commands, and transmit them over an HDMI connection to, e.g., display 112, cable box 114, or streaming box 118. In some examples, ZTP device 104 may automatically invoke Android ® Operating System (OS)' "one touch play" feature. One touch play may allow a media source device to turn on a display 112 and switch its input port automatically, without the need for a remote control. ZTP device 104 may control the display 112 to switch to the media input source for the ZTP device itself 104, or to a specified input corresponding to one of the content source devices 110.

ZTP device 104 may be configured to be controlled via one or more local control options, such as a physical remote control, control elements on the ZTP device itself, or other local inputs. As used herein, local controls or local inputs may include control devices physically proximate to the ZTP device 104, which may send inputs from the control device to the ZTP device 104 via wired electrical connections, infrared signals, Bluetooth, local Wi-Fi, radio frequency, or other limited-range transmission options. ZTP device 104 may also be controlled remotely, for example based on control commands from config service 102, user device 106 (e.g., via a web-based interface over Wi-Fi), or other means.

In some examples, ZTP device 104 or display 112 may connect to config service 102 and provide details on potential input sources for display 112. For example, a display may indicate to config service 102 (either directly, or via ZTP device 104), how many inputs of each type it has (e.g., 4 HDMI inputs, one coaxial input, etc.). In another example, ZTP device 104 or display 112 may determine what content source devices 110 are available via what input ports (e.g., Cable box 114 on HDMI port 1, antenna 116 on coaxial cable input, etc.), which information may be provided to config service 102. The config service 102 may utilize the input options when generating the web interface API, allowing a user (via user device 106) to specify what content source 110 or display 112 input to set the display to 112 on wakeup or at other times.

User device 106 may include a computing device such as a smartphone, tablet, laptop, or other personal computing system. A user may access or change ZTP configuration settings and schedules via user device 106, for example by accessing config service 102 or ZTP device 104 via network 108. In an example, user device 106 may be used to specify when to turn on (e.g., activate or wake) display 112, when to turn off (e.g., set to standby or sleep mode) display 112, and what content source 110 to set the display 112 to show at selected times. The ZTP schedule may be set based on business hours at which the display 112 is situated, according to a different selected schedule, or a combination thereof.

While the system 100 has been described in relation to an example embodiment in which a display 112 situated at a business venue, the current disclosure is not limited thereto. ZTP controls may be used for displays or other devices in private homes, public spaces, or other implementations. In this manner, a display 112 at a home or venue may be configured to switch on at a desired time, be set to a desired input, and play content without any direct or in-the-moment human intervention. The display 112 may then be automatically shut off in a similar manner. This may alleviate the issues of requiring a human to directly manage turning on, setting inputs, and turning off devices at appropriate times with local controls. An example user interface for a zero touch play is described in regard to FIG. 2.

Figure 2:
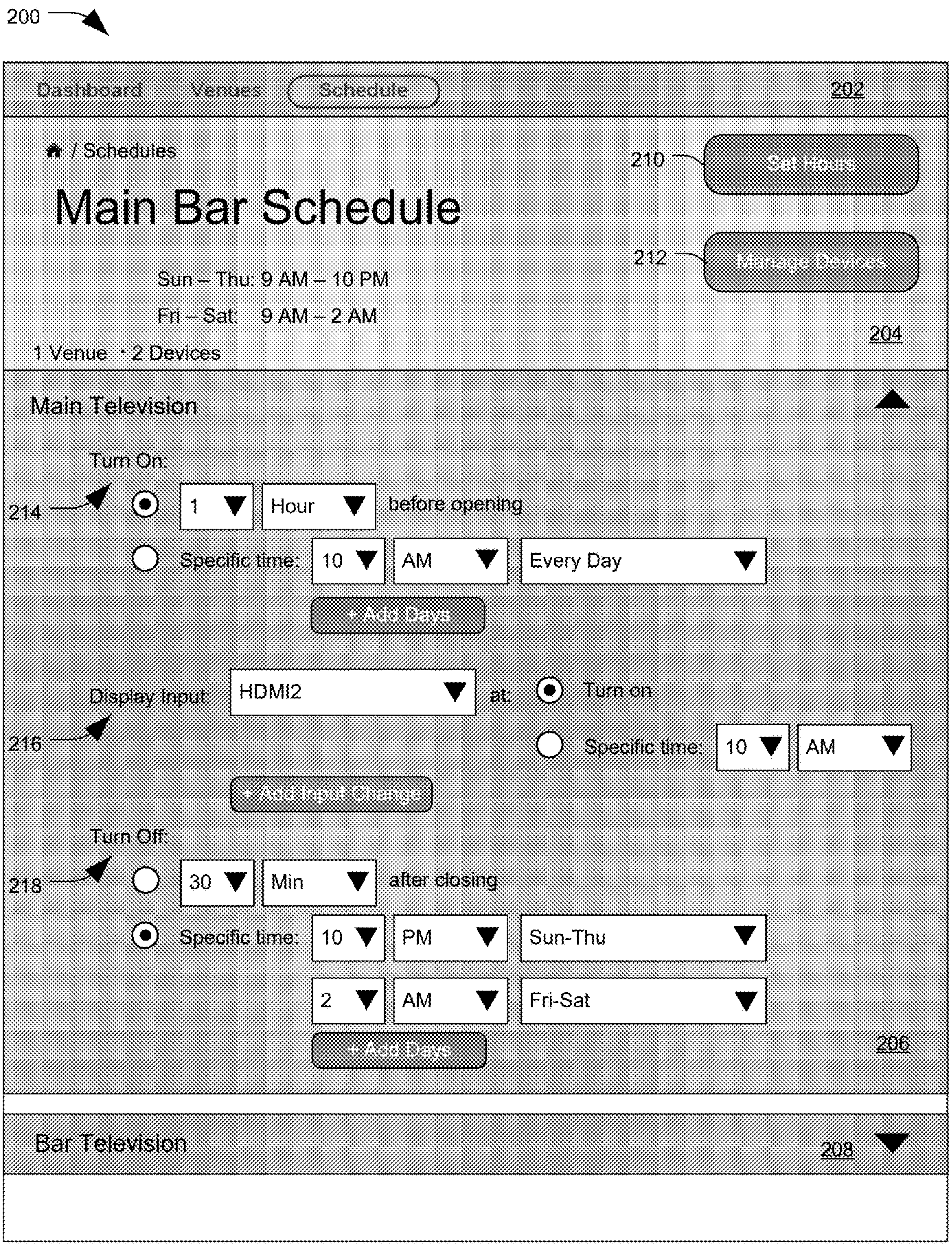
FIG. 2 is a diagram of a system configured to implement zero touch play, in accordance with certain embodiments of the present disclosure.

FIG. 2 depicts a diagram of an example system 200 configured to implement zero touch play, in accordance with certain embodiments of the present disclosure. In particular, FIG. 2 presents an example embodiment of a user interface (UI) for viewing or setting a zero touch play (ZTP) schedule and configuration settings to implement at a display device. In some embodiments, the system 200 of FIG. 2 may be implemented by elements of system 100 of FIG. 1, such as configuration service 102, ZTP device 104, or user device 106. For example, the schedule may be maintained by configuration service 102 on the backend, while the user interface for viewing and managing the schedule may be displayed via user device 106 or ZTP device 104, using a webapp or other API interface.

Example system 200 may include a navigation bar 202, which may include links or buttons to access a dashboard, venue settings, and zero touch play schedule settings. A dashboard may represent a home screen or system overview, and in some embodiments may be where a user may manage their profile details or other overall account or system settings.

A venue settings menu may allow a user to set up or configure venues associated with their ZTP device or account. For example, a customer account may be for a chain of restaurants, and each restaurant may have a corresponding venue. Each venue may have different operating hours, or may follow a different weekly schedule for what screens should display at various times. Each venue may potentially have one or more ZTP devices and associated screens. Accordingly, the venue page or menu may be used to set up or manage associated devices, preferences, demographics, or other details. In some examples, rather than "venue", the system 200 may allow users to set up schedules for displays at multiple private properties, or for different members of a family, or other arrangements.

A ZTP schedule menu may be used to manage ZTP devices for each screen or display for a given venue, including setting schedule for turning displays on or off, and source or input settings for the display. In the example of system 200, the UI may be set to the ZTP schedule menu.

System 200 may include a submenu navigation bar 204, which may be used to navigate within available features or submenus of the ZTP schedule menu of main navigation bar 202. The submenu navigation bar 204 shows that a user is navigated to a path "home/schedules", for a "Main Bar Schedule" target venue or device. The submenu navigation bar 204 may show that the user is viewing a UI for viewing, creating, or editing one or more schedules for one or more target venues or devices (e.g., for a main bar). The submenu may indicate how many venues are set up, and a number of ZTP devices for the displayed venue.

The submenu navigation bar 204 may include buttons or links to "set hours" 210, and to "manage devices" 212. The set hours button 210 may allow a user to define the operating hours for the target venue. The same hours may be specified for sets of days, with the option of having different hours for each day or set of days. The manage devices button 212 may allow a user to add or remove ZTP devices for the target venue. Further, a user may be able to configure the input options for displays associated with each ZTP device, provide a nickname for each device, or perform additional device management operations. In the depicted example of system 200, each added device for the target venue may be displayed further down the UI as a collapsable submenu; such as a "main television" submenu 206, and a "bar television" submenu 208. The main television submenu 206 may be expanded, while the bar television submenu 208 may be collapsed, in the example view.

The main television submenu 206 may provide a variety of options for managing the behavior of the associated ZTP device, such as "turn on" options 214, display input options 216, and "turn off" options 218.

The "turn on" options 214 may allow a user to direct the "main television" ZTP device to turn on the display based on the operating hours of the venue 204, or according to specified time schedule. In the depicted example, the user has selected the option to turn on the display 1 hour before the opening time of the venue listed in submenu 204. Alternately, the user could select to turn on the display at a specific listed time, which time may be set separately for different days or sets of days.

The "display input" options 216 may allow a user to specify which display input or content source to set the display to at selected periods, such as when the display is first turned on, or at selected specific times. A user may have the option to add multiple input switches at selected times.

The "turn off" options 218 may allow a user to direct the "main television" ZTP device to turn off the display based on the operating hours of the venue 204, or according to specified time schedule. In the depicted example, the user has selected the option to turn off the display at 10 PM Sunday through Thursday, and at 2 AM at night for Friday and Saturday. A user may be able to add customized times for additional days or day ranges.

The "bar television" submenu 208, if expanded, may show similar configuration options to those depicted for main television submenu 206. An additional display or ZTP device submenu may be added to the UI interface 200 for each additional display or ZTP device added to the venue.

By configuring the ZTP devices ahead of time using an interface, such as that shown in system 200, a user may be able to set up display devices to turn on or off at desired times, to desired input or content sources, consistently and without the need for direct human interaction or the need to locate and use a local remote or other control device. The depicted system may ensure smooth, consistent, and frustration-free usage of a venue's display systems. An example process flow for a system configured for zero touch play is described in regard to FIG. 3.

Figure 3:
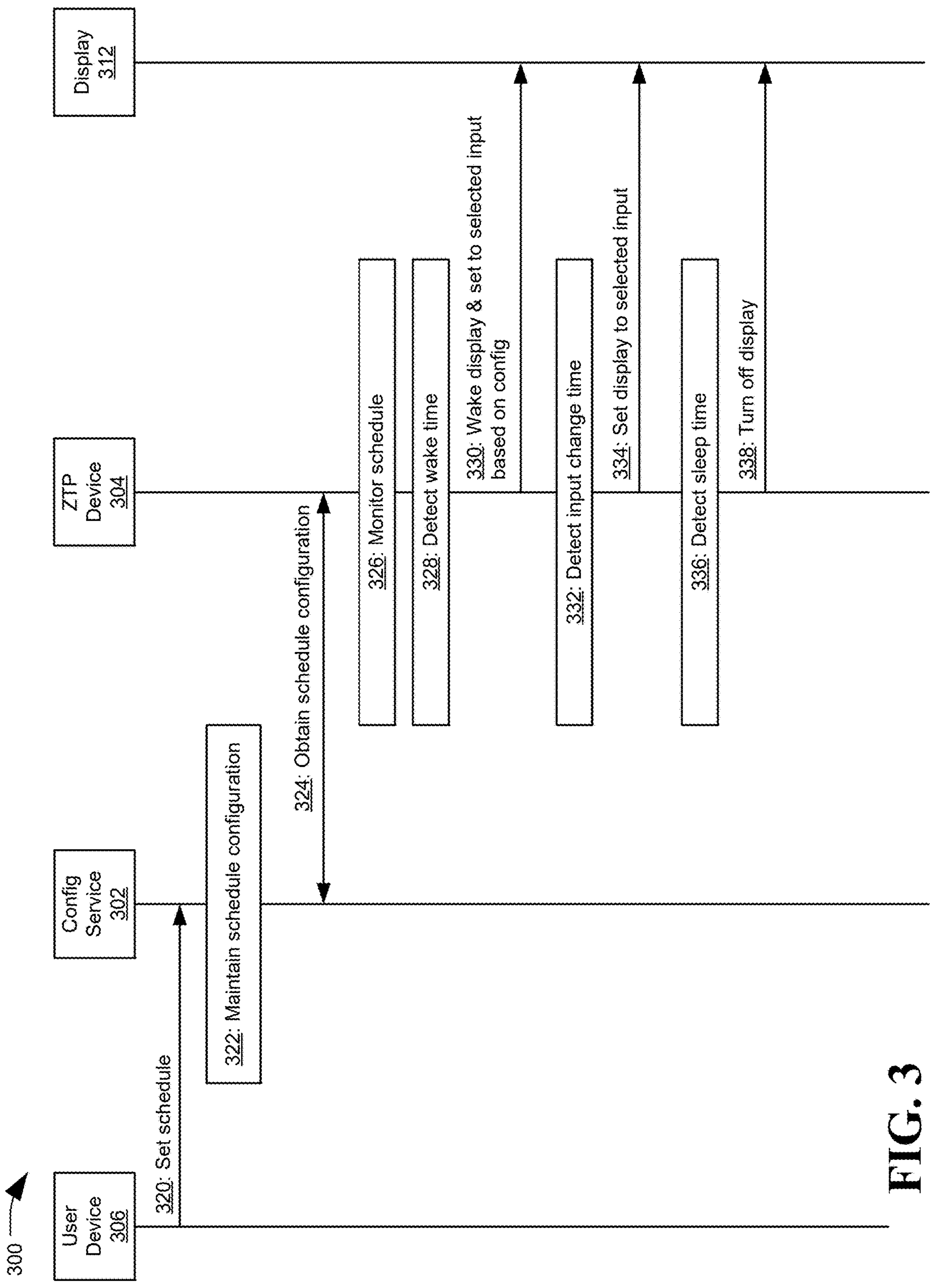
FIG. 3 is a process flow diagram of a system configured to implement zero touch play, in accordance with certain embodiments of the present disclosure.

FIG. 3 is a process flow diagram 300 of a system configured to implement zero touch play, in accordance with certain embodiments of the present disclosure. In particular, the diagram of FIG. 3 may depict a method or process for setting and implementing a zero touch play schedule for a display device. The method may be implemented by components such as user device 306, configuration service 302, ZTP device 304, and display device 312. The components of flowchart 300 may correspond to elements shown in FIG. 1, such as user device 106, configuration service 102, ZTP device 104, and display device 112, respectively. Other components, such as network 108 or content source(s) 110, or some combination thereof, may also be included in the method of FIG. 3.

At 320, the method may include setting a ZTP schedule, using user device 306, at configuration service 302. The schedule may be set using an app, web interface, or other API element accessible by user device 306 (or in some examples, using a UI displayed via ZTP device 304 on display 312). Setting the schedule may include specifying what time display 312 should be turned on or turned off, and may include setting times to change an input or content source displayed on display device 312. In some examples, different schedules may be set for different days.

At 322, the method may include maintaining a schedule configuration at config service 302, based on the schedule set at 320. The config service 302 may maintain a database or other information catalog that associates the schedule set by user device 306 with a particular ZTP device 304, venue, or display 312, so that the proper schedule is implemented by the proper equipment.

At 324, the method may include the ZTP device 304 obtaining the schedule configuration data. The schedule may be sent to ZTP device 304 (e.g., over network 108) by config service 302, or the ZTP device 304 may access config service 302 to retrieve the schedule information. In an example embodiment, the ZTP device 304 may connect to config service 302 and obtain the schedule at initial boot, and checks for updates to the schedule at selected intervals, to capture any changes or updates to the schedule that a user may make. The ZTP device 304 may store a copy of the schedule locally to control its operations.

The ZTP device 304 may monitor the schedule, at 326. For example, the ZTP device 304 may have an internal clock, and the ZTP device may compare it's internal clock against trigger points in the schedule, even when the ZTP device is in rest or standby mode. When the internal clock value matches an operation trigger time in the schedule, the ZTP may wake, when appropriate, and then execute the scheduled operation.

At 328, the ZTP device 304 may detect a wake time event in the schedule. The wake time event may direct the ZTP device 304 to turn on the display 312, and may specify a device input or content source to set the display 312 to. Accordingly, at 330 the method may include the ZTP device 304 waking the display 312, and setting the display 312 to show a selected input based on the schedule configuration information. In an example, the ZTP device 304 may be connected to display 312 via an HDMI connection, and may use HDMI-CEC controls to wake the display 312, and may direct display 312 to set its input to the selected input source. In another example, the selected content source may be connected to display 312 via ZTP device 304, and therefore the ZTP device 304 may wake display 312 and set it to the ZTP device input source, and then route the video feed from the content source to the display device 312. Other embodiments are also possible.

At 332, the ZTP device 304 may detect an input change time event in the schedule. An input change time event may be a specified time at which the display 312 should be changed to a specified input port or content source. Accordingly, at 334 the ZTP device 304 may send a control command to display 312 to change to the selected input, for example via an HDMI-CEC command. In another example, the ZTP device 304 may change to a selected content source connected to the ZTP device 304, and route the video feed to the display device 312 over the ZTP device's own connection to the display 312.

At 336, the ZTP device 304 may detect a sleep time event in the schedule. A sleep time event may be a specified time at which the display 312 should be switched to a sleep or standby mode, or turned off. Accordingly, at 338, the ZTP device 304 may send a control command to display 312 to enter a sleep or standby mode, for example via an HDMI-CEC command. The ZTP device 304 may also enter a standby mode in response to the sleep time event, but may continue monitoring its internal clock and the ZTP schedule for future events, such as the next wake time event. An example method for implementing zero touch play is described in regard to FIG. 4.

Figure 4:
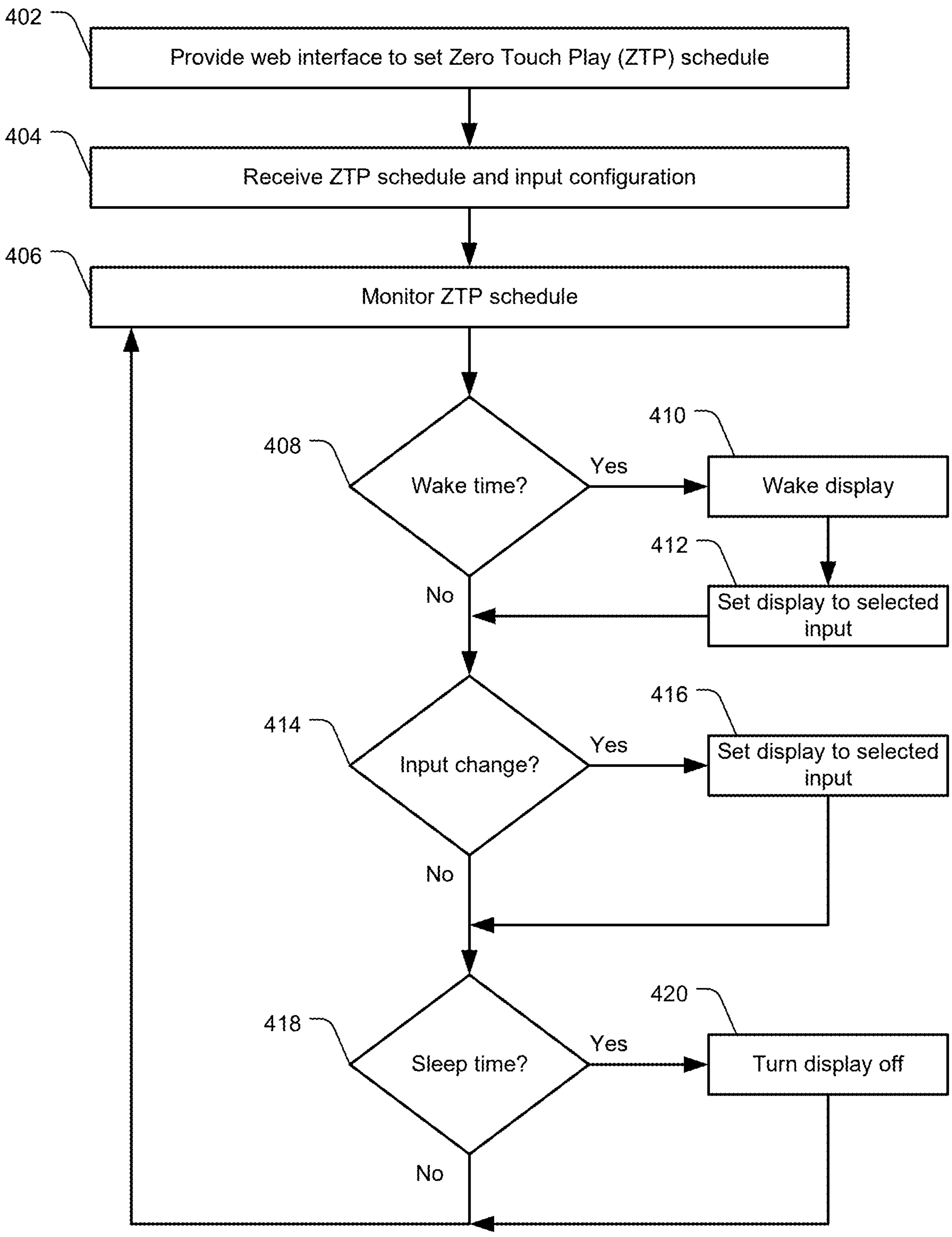
FIG. 4 depicts a flowchart of an example method for implementing zero touch play, in accordance with certain embodiments of the present disclosure.

FIG. 4 depicts a flowchart 400 of an example method for implementing zero touch play, in accordance with certain embodiments of the present disclosure. In particular, the method of FIG. 4 may be a process for setting and implementing a zero touch play schedule for a display device. The method may be implemented by components described in regard to FIG. 1, such as configuration service 102 or ZTP device 104. Other components, such as user device 106, display device 112, network 108, or content source(s) 110, or some combination thereof, may also be involved in the method of FIG. 4.

The method may include providing a web interface, app, or other interface to connect with a cloud service or API for setting a zero touch play (ZTP) schedule, at 402. The interface may be hosted by or provide access to a configuration service that stores a copy of a user-defined ZTP schedule, and communicates with a local ZTP device for implementing the schedule at a display device. In another example, the schedule may be provided to a ZTP device locally, which may implement the schedule directly.

At 404, the method may include receiving the ZTP schedule and input configuration details. The ZTP schedule and configuration details may include what ZTP device, display device, venue, or a combination thereof, at which the ZTP schedule should be executed or implemented. Further, the configuration details may include times at which the display should be turned on, off, or switched to a different input or content feed, as well as what input or content feed the display should be switched to. The ZTP schedule and configuration may be stored, such as at a configuration service 102, ZTP device 104, or both. In an example, the schedule may be stored at configuration service 102, and the ZTP device 104 may periodically retrieve or be sent a copy of the schedule for storing locally. In another example, the schedule and configuration details may be entered to and stored at the ZTP device 104 directly.

At 406, the method may include monitoring the ZTP schedule. The schedule may be monitored and acted upon by the ZTP device 104. In another example, the schedule may be monitored by a configuration service 102, which may send a local ZTP device 104 commands when operations are to be executed according to the schedule. Trigger events from the schedule may include a wake time event, a sleep time or standby time event, an input change event, or other events. The schedule may include time indicators for when various operations are to be implemented, and the schedule may be compared against a clock or timer to determine when to implement the operations.

The method may include determining whether the current time corresponds to a wake time event, at 408. If so, the ZTP device may wake, if appropriate, and then send a command to the display device to wake, at 410. At 412, the method may include setting the display to a selected input, or content source, if such a configuration setting is selected.

After waking the display at 410 and 412, or if no wake time event is currently detected, at 408, the method may include determining whether the current time corresponds to an input change event, at 414. There may be no input change events, independent from a wake time event, throughout a day; or there may be one or more input change events during a day. If there is an input change event, the method may include setting the display to the selected input, at 416.

If no input change event is currently detected, the method may include determining whether the current time corresponds to a sleep time event, at 418. If so, the method may include turning the display off, or setting into a sleep mode or standby mode, at 420, and the ZTP device may itself enter a sleep or standby mode, depending on settings. Regardless of whether a sleep time event was currently detected or if the ZTP device has entered a standby mode, the method may include continuing to monitor the ZTP schedule, at 406. An example system configured to implement zero touch play is described in regard to FIG. 5.

Figure 5:
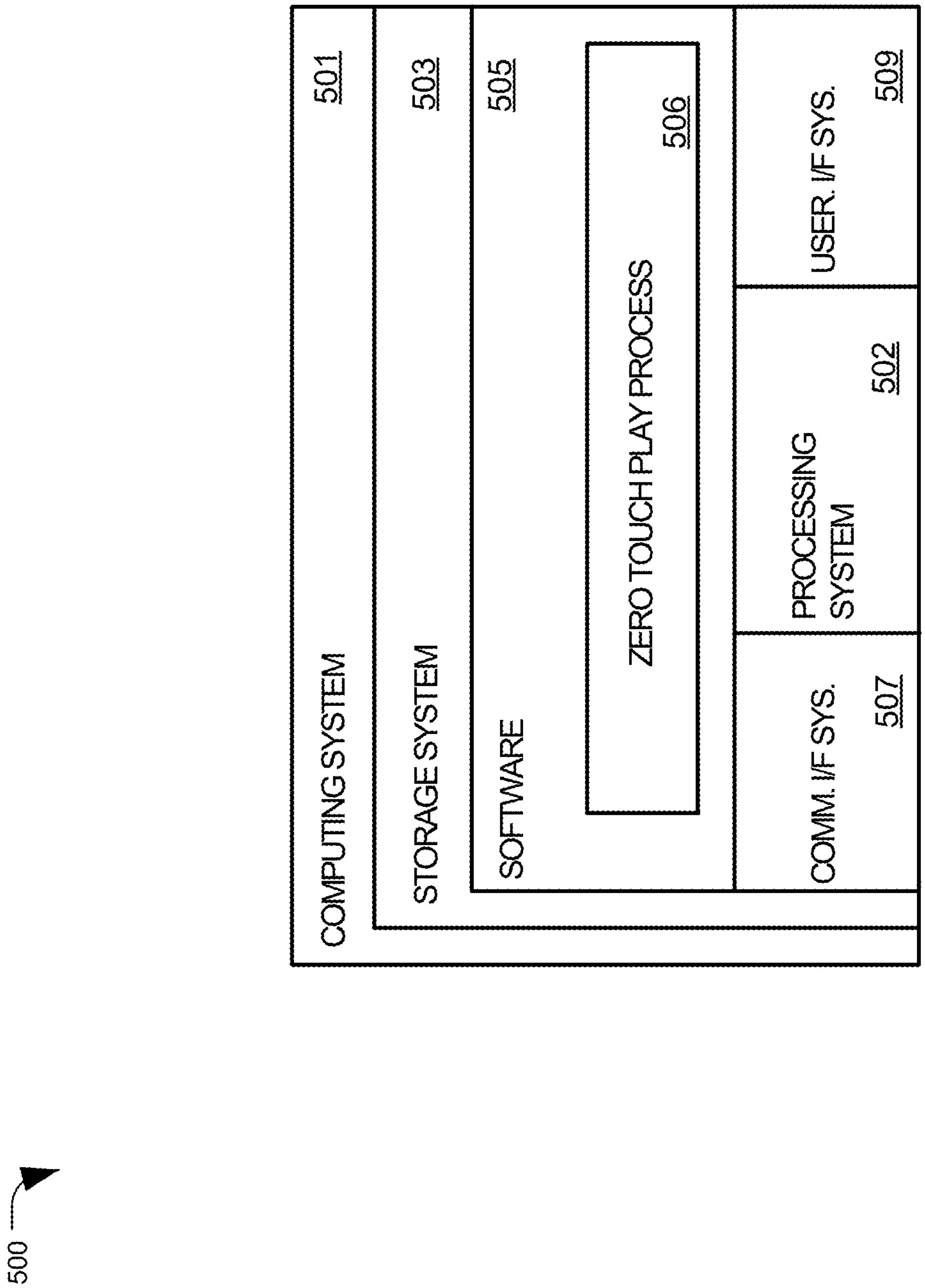
FIG. 5 is a diagram of a system configured to implement zero touch play, in accordance with certain embodiments of the present disclosure.

FIG. 5 is a diagram of an example system 500 configured to implement zero touch play, in accordance with certain embodiments of the present disclosure. System 500 may be an example of an apparatus including a computing system 501 that is representative of any system or collection of systems in which the various processes, systems, programs, services, and scenarios disclosed herein may be implemented. For example, computing system 501 may be an example of configuration service 102, ZTP device 104, user device 106, content sources 110, display device 112, network 108, or any of the subcomponents depicted in system 100 of FIG. 1. Examples of computing system 501 include, but are not limited to, server computers, desktop computers, laptop computers, smart devices, routers, switches, web servers, cloud computing platforms, and data center equipment, as well as any other type of physical or virtual server machine, physical or virtual router, cloud containerized application, and any variation or combination thereof.

Computing system 501 may be implemented as a single apparatus, system, or device or may be implemented in a distributed manner as multiple apparatuses, systems, or devices. Computing system 501 may include, but is not limited to, processing system 502, storage system 503, software 505, communication interface system 507, and user interface system 509. Processing system 502 may be operatively coupled with storage system 503, communication interface system 507, and user interface system 509.

Processing system 502 may load and execute software 505 from storage system 503. Software 505 may include and implement zero touch play (ZTP) process 506, which may be representative of any of the operations for presenting a ZTP scheduling interface, storing a ZTP schedule and associated configuration information, or implementing a ZTP schedule to automatically control a display device, as discussed with respect to the preceding figures. When executed by processing system 502, software 505 may direct processing system 502 to operate as described herein for at least the various processes, operational scenarios, and sequences discussed in the foregoing implementations. Computing system 501 may optionally include additional devices, features, or functionality not discussed for purposes of brevity.

In some embodiments, processing system 502 may comprise a micro-processor and other circuitry that retrieves and executes software 505 from storage system 503. Processing system 502 may be implemented within a single processing device but may also be distributed across multiple processing devices or sub-systems that cooperate in executing program instructions. Examples of processing system 502 may include general purpose central processing units, graphical processing units, application specific processors, and logic devices, as well as any other type of processing device, combinations, or variations thereof.

Storage system 503 may comprise any memory device or computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 (including ZTP process 506 among other functions) may be implemented in program instructions that may, when executed by processing system 502, direct processing system 502 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtualization software, or other application software. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system as described herein. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g., steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:

implementing a zero touch play (ZTP) system for automated hardware-level display device control via a ZTP device connected to a display device, including:

determining a schedule to implement for the display device;

locally monitoring, at the ZTP device, the schedule for a wake time trigger event indicating when to wake up the display device;

in response to detecting the wake time trigger event:

sending, from the ZTP device, a first hardware-level control command directing the display device to enter an active state; and setting, by the ZTP device, the display device to a selected input source from a plurality of hardware input sources to play on the display device, each input source configured to receive content from a different content source device.

2. The method of claim 1 further comprising:

the schedule corresponds to the operating hours of a business at which the display device is located.

3. The method of claim 1 further comprising:

presenting, via a cloud-based configuration service, a web interface accessible by a user device; and receiving the schedule and the selected input source via inputs to the web interface from the user device.

4. The method of claim 3 further comprising:

obtaining a copy of the schedule from the cloud-based configurations service at a ZTP device connected to the display device;

sending the first hardware-level control command to the display device via the ZTP device; and setting the display device to the selected input source via the ZTP device.

5. The method of claim 4 further comprising:

monitoring the schedule for a sleep time trigger event indicating when to put the display device into a standby state; and in response to detecting the sleep time trigger event, sending a second control command directing the display device to enter the standby state.

6. The method of claim 5 further comprising entering a sleep mode at the ZTP device in response to the sleep time trigger event.

7. The method of claim 6 further comprising:

monitoring for the wake time trigger event at the ZTP device while the ZTP device is in the sleep mode;

waking up the ZTP device in response to the wake time trigger event; and sending the first hardware-level control command from the ZTP device to the display device.

8. The method of claim 7 further comprising:

monitoring the schedule for an input change trigger event indicating when to set the display device to a second input source to play on the display device; and in response to detecting the input change trigger event, sending a third control command directing the display device to change to the second input source.

9. The method of claim 8 further comprising:

sending the first hardware-level control command as an HDMI (high-definition multimedia interface)-CEC (consumer electronics control) command from the ZTP device to the display device.

10. A system comprising:

a zero touch play (ZTP) system configured to implement automated hardware-level control of a display device via a ZTP device connected to the display device, including:

determine a schedule to implement for a display device;

locally monitor, at the ZTP device, the schedule for a wake time trigger event indicating when to wake up the display device;

in response to detecting the wake time trigger event:

send, from the ZTP device a first hardware-level control command directing the display device to enter an active state; and set, by the ZTP device, the display device to a selected input source from a plurality of hardware input sources to play on the display device, each input source configured to receive content from a different content source device.

11. The system of claim 10 further comprising:

present, via a cloud-based configuration service, a web interface accessible by a user device; and receive the schedule and the selected input source via inputs to the web interface from the user device.

12. The system of claim 10 further comprising:

monitor the schedule at a ZTP device connected to the display device;

send the first hardware-level control command to the display device via the ZTP device; and set the display device to the selected input source via the ZTP device.

13. The system of claim 12 further comprising:

monitor for the wake time trigger event at the ZTP device while the ZTP device is in a sleep mode;

wake up the ZTP device in response to the wake time trigger event; and send the first hardware-level control command from the ZTP device to the display device.

14. The system of claim 10 further comprising:

monitor the schedule for a sleep time trigger event indicating when to put the display device into a standby state; and in response to detecting the sleep time trigger event, send a second control command directing the display device to enter the standby state.

15. The system of claim 10 further comprising:

monitor the schedule for an input change trigger event indicating when to set the display device to a second input source to play on the display device; and in response to detecting the input change trigger event, send a third control command directing the display device to change to the second input source.

16. A memory device storing instructions that, when executed, cause a processor to perform a method comprising:

implementing a zero touch play (ZTP) system for automated hardware-level display device control via a ZTP device connected to a display device, including:

determining a schedule to implement for the display device;

locally monitoring, at the ZTP device, the schedule for a wake time trigger event indicating when to wake up the display device;

in response to detecting the wake time trigger event:

sending, from the ZTP device, a first hardware-level control command directing the display device to enter an active state; and setting, by the ZTP device, the display device to a selected input source from a plurality of hardware input sources to play on the display device, each input source configured to receive content from a different content source device.

17. The memory device of claim 16 storing instructions that, when executed, cause the processor to perform the method further comprising:

obtaining the schedule and the selected input source at the ZTP device from a cloud-based configuration service.

18. The memory device of claim 16 storing instructions that, when executed, cause the processor to perform the method further comprising:

monitoring the schedule for a sleep time trigger event indicating when to put the display device into a standby state;

in response to detecting the sleep time trigger event, sending a second control command directing the display device to enter the standby state; and entering a sleep mode at the ZTP device.

19. The memory device of claim 18 storing instructions that, when executed, cause the processor to perform the method further comprising:

monitoring for the wake time trigger event while the ZTP device is in the sleep mode;

waking up the ZTP device in response to the wake time trigger event; and sending the first hardware-level control command from the ZTP device to the display device after waking up.

20. The memory device of claim 16 storing instructions that, when executed, cause the processor to perform the method further comprising:

monitoring the schedule for an input change trigger event indicating when to set the display device to a second input source to play on the display device; and in response to detecting the input change trigger event, sending a third control command directing the display device to change to the second input source.

* * * * *